United States Patent
Numaoka et al.

(10) Patent No.: US 8,589,551 B2
(45) Date of Patent: Nov. 19, 2013

(54) MULTIPROCESSOR COMPUTER AND NETWORK COMPUTING SYSTEM PROCESSING USE AND PROVISION OF HARDWARE RESOURCE VIA A NETWORK

(75) Inventors: Chisato Numaoka, Kanagawa (JP); Ken Kutaragi, Tokyo (JP); Masayuki Chatani, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 489 days.

(21) Appl. No.: 12/294,483

(22) PCT Filed: Oct. 2, 2006

(86) PCT No.: PCT/JP2006/319678
§ 371 (c)(1),
(2), (4) Date: Aug. 3, 2010

(87) PCT Pub. No.: WO2007/110987
PCT Pub. Date: Oct. 4, 2007

(65) Prior Publication Data
US 2011/0022712 A1    Jan. 27, 2011

(30) Foreign Application Priority Data
Mar. 28, 2006  (JP) .................................. 2006-087145

(51) Int. Cl.
*G06F 15/173*  (2006.01)
*G06F 9/46*  (2006.01)
(52) U.S. Cl.
USPC .......................................... 709/226; 718/104
(58) Field of Classification Search
USPC .......................................... 709/226; 718/104
See application file for complete search history.

(56) References Cited

U.S. PATENT DOCUMENTS 5,179,702 A * 1/1993 Spix et al. .................... 718/102
5,193,172 A * 3/1993 Arai et al. .................... 718/104
(Continued)

FOREIGN PATENT DOCUMENTS

JP    2005-339401    12/2005
JP    2006-48442    2/2006

OTHER PUBLICATIONS http://    en.wikipedia.org/wiki/Symmetric_multiprocessing; Wikipedia; Wikimedia Foundation, Inc; Feb. 8, 2011.*

(Continued)

*Primary Examiner* — Asghar Bilgrami
(74) *Attorney, Agent, or Firm* — Katten Muchin Rosenman LLP (57) ABSTRACT

In distributed processing on a network, improvement of resource management and high efficiency of task scheduling are becoming the goals that need to be achieved. In a multiprocessor computer, a sub-processor included in a multiprocessor brings a resource manager into operation, while the resource manager being loaded in local memory, which receives resource information that can be provided from a computer on a network via a network and manages the resource information, and processes provision of the resource being managed when a request for use of the resource is received. Other sub-processors bring a resource scheduler into operation, while the resource scheduler being loaded in the local memory, which receives a request for use of a resource from a computer on a network and manages the request for use of a resource, and allocates a resource provided by the resource manager as a mediator in response to the request for use of the resource.

5 Claims, 9 Drawing Sheets

(56) References Cited

U.S. PATENT DOCUMENTS

| | | | |
|---|---|---|---|
| 6,101,547 A * | 8/2000 | Mukherjee et al. | 709/231 |
| 6,105,053 A * | 8/2000 | Kimmel et al. | 718/105 |
| 6,947,987 B2 * | 9/2005 | Boland | 709/226 |
| 7,287,127 B2 * | 10/2007 | Anand et al. | 711/147 |
| 7,448,037 B2 * | 11/2008 | Arimilli et al. | 718/104 |
| 7,856,632 B2 * | 12/2010 | Klingman | 718/100 |
| 2006/0028677 A1 | 2/2006 | Isshiki et al. | |

OTHER PUBLICATIONS

International Search Report dated Dec. 12, 2006, from the corresponding International Application.

International Preliminary Report on Patentability dated Sep. 30, 2008, from the corresponding International Application.

International Preliminary Report on Patentability and Written Opinion of the International Searching Authority dated Oct. 21, 2008, from the corresponding International Application.

Nazareno Andrade, et al. "OurGrid: An Approach to Easily Assemble Grids with Equitable Resource Sharing" Proceedings of 9th International Workshop on Job Scheduling Strategies for Parallel Processing, LNCS2862, Jun. 24, 2003, p. 61-86.

Notification of Reason(s) for Refusal dated Dec. 13, 2011, from corresponding Japanese Application No. 2006-087145.

* cited by examiner

MULTIPROCESSOR COMPUTER AND NETWORK COMPUTING SYSTEM PROCESSING USE AND PROVISION OF HARDWARE RESOURCE VIA A NETWORK

TECHNICAL FIELD

The present invention relates a multiprocessor computer and a network computing system. In particular, the present invention relates to a technique for distributed processing by a plurality of computers on the network.

BACKGROUND TECHNOLOGY

As a form of distributed computing, a technique called grid computing is often used in recent years. The grid computing is a method for establishing a virtual high-performance multiprocessing system by combining via a network multiple computers that have limited performance individually. Users of the grid computing can realize effective computing by using resources such as a processor and a memory provided by this virtual multiprocessing system.

Often times, basically different models of PC's are combined in grid computing. Thus, in general, an interface for assigning tasks (also called "job" or "process") to each computer is prepared, and via this interface, resources for each computer are allocated.

SUMMARY OF THE INVENTION

Means for Solving the Problem

When assigning tasks to the resources is relatively less frequently, there are a little task scheduling problems. This is because once tasks are assigned to multiple computers, a processor can be almost occupied until each task is finished.

However, when each processor has a relatively high performance and the time required for a processor to execute a task is relatively short, the management of the resources distributed in the network and the efficiency of task scheduling have a great influence over the whole performance of a system. In fact, since recent one-chip multiprocessors grow dramatically in performance compared to conventional general-purpose processors, improvement of resource management and high efficiency of task scheduling are becoming the goals that need to be achieved.

In this background, a general purpose of the present invention is to establish an arrangement where hardware resources on a network can be efficiently used.

Means for Solving the Problem

A multiprocessor computer according to one embodiment of the present invention comprises: a multiprocessor including a plurality of processors, each having local memory and operating independently; and a network communication unit operative to transmit and to receive data to and from a computer on a network. The multiprocessor includes: a first processor operative to bring a resource manager into operation, the resource manager is loaded in the local memory for receiving hardware resource information that can be provided from a computer on a network via a network, for managing the hardware resource information, and for providing the hardware resource being managed when a request for use of the hardware resource is received; and a second processor operative to bring a resource scheduler into operation, the resource scheduler is loaded in the local memory for receiving a request for use of a hardware resource from a computer on a network, for managing the request for use of a hardware resource, and for allocating a hardware resource provided by the resource manager as a mediator in response to the request for use of the hardware resource.

The "multiprocessor" may be a one-chip multiprocessor. The "processor" may run independently without an interrupt processing, and the "plurality of processors" may perform processes asynchronously of one another. There is a variety of hardware that can be considered as the "hardware resource". It may be, for example, any of the plurality of processors or, in a computer provided with a plurality of multiprocessors, it may be any of the multiprocessors. It may also be a part of a recording medium such as memory and hard disk, a communication device such as wireless communication, or an external peripheral device.

According to the present aspect, the operation of the resource manager and the operation of the resource scheduler can be distributed to and performed by separate processors that run independently so that each process can be sped up and the real-time processing and the efficiency of a distributed processing on a network can be improved.

Another aspect of the present invention relates to a multiprocessor computer. The multiprocessor computer comprises: a first multiprocessor including a plurality of processors, each having local memory and operating independently; a second multiprocessor connected to the first multiprocessor via a high-speed bus, including a plurality of processors, each having local memory and operating independently; and a network communication unit operative to transmit and to receive data to and from a computer on a network. The first multiprocessor includes a processor running a resource manager, the resource manager is loaded in the local memory for receiving hardware resource information that can be provided from a computer on a network via a network, for managing the hardware resource information, and for providing the hardware resource being managed when a request for use of the hardware resource is received, and the second multiprocessor includes a processor running a resource scheduler, the resource scheduler is loaded in the local memory for receiving a request for use of a hardware resource from a computer on a network, for managing the request for use of a hardware resource, and for allocating a hardware resource provided by the resource manager as a mediator in response to the request for use of the hardware resource.

According to the aspect, the operation of the resource manager and the operation of the resource scheduler can also be distributed to and performed by separate processors that run independently so that each process can be sped up and the real-time processing and the efficiency of a distributed processing on a network can be improved.

Another aspect of the present invention relates to a multiprocessor computer. The multiprocessor computer comprises: a multiprocessor including a plurality of processors, each having local memory and operating independently; a network communication unit operative to transmit and to receive data to and from a computer on a network. The multiprocessor includes a processor running a resource manager, the resource manager is loaded in the local memory for receiving hardware resource information that can be provided from a computer on a network via a network, for managing the hardware resource information, and for providing the hardware resource being managed when a request for use of the hardware resource is received from a resource scheduler that runs on an external computer on the network.

According to the present aspect, the operation of the resource manager and the operation of the resource scheduler can also be distributed to and performed by separate processors that run independently so that each process can be sped up and the real-time processing and the efficiency of a distributed processing on a network can be improved.

Another aspect of the present invention relates to a multiprocessor computer. The multiprocessor computer comprises: a multiprocessor including a plurality of processors, each having local memory and operating independently; a network communication unit operative to transmit and to receive data to and from a computer on a network. the multiprocessor includes a processor running a resource scheduler, the resource scheduler is loaded in the local memory for receiving a request for use of a hardware resource from a computer on a network, for managing the request for use of a hardware resource, and for allocating a hardware resource provided by a resource manager as a mediator which runs on an external computer on the network in response to the request for use of the hardware resource.

According to the present aspect, the operation of the resource manager and the operation of the resource scheduler can also be distributed to and performed by separate processors that run independently so that each process can be sped up and the real-time processing and the efficiency of a distributed processing on a network can be improved.

Another aspect of the present invention relates to a network computing system. The network computing system includes a plurality of computers interconnected via a network, wherein the plurality of computers includes: a computer operative, by using any of processors in a multiprocessor including a plurality of processors each having local memory and operating independently, to run a resource manager, the resource manager is loaded in local memory for receiving hardware resource information that can be provided from a computer on a network via a network, for managing the hardware resource information, and for providing the hardware resource being managed when a request for use of the hardware resource is received; a computer operative, by using any of processors in a multiprocessor including a plurality of processors each having local memory and operating independently, to run a resource scheduler, the resource scheduler is loaded in local memory for receiving a request for use of a hardware resource and for allocating a hardware resource provided by the resource manager as a mediator in response to the request for use of the hardware resource; and a client computer operative to run a resource management client which transmits, when a hardware resource can be provided to other computers, the information of the hardware resource to the resource manager and which transmits, when using a hardware resource of other computers, a request for use of a hardware resource to the resource scheduler.

According to the present aspect, the operation of the resource manager and the operation of the resource scheduler can also be distributed to and performed by separate processors that run independently so that each process can be sped up and the real-time processing and the efficiency of a distributed processing on a network can be improved.

Another aspect of the present invention relates to a multiprocessor computer. The multiprocessor includes a plurality of processors, each having local memory and operating independently; and a network communication unit operative to transmit and to receive data to and from other multiprocessor computers running a resource manager which manages the information of a hardware resource that can be provided via a network from a computer on a network and which provides the hardware resource, and to transmit and to receive data to and from other multiprocessor computers running a resource scheduler which allocates in response to the request for use of the hardware resource a hardware resource provided by the resource manager as a mediator upon the receipt of a request for use of the hardware resource from the computer on the network. The multiprocessor comprises: a processor running a resource management client which transmits, when a hardware resource can be provided to other multiprocessor computers, the information of the hardware resource to the resource manager that runs on any of multiprocessor computers on a network and which transmits, when using a hardware resource of other multiprocessor computers, a request for use of a hardware resource to the resource scheduler that runs on any multiprocessor computers on the network.

According to the aspect, when an unused resource becomes available in a multiprocessor computer, resource information indicating that the unused resource can be provided is transmitted to a resource manager. On the contrary, in using an unused resource of other computers, a request for use of the resource is transmitted to the resource scheduler. This allows the switch-over of the provision and the use of resources accordingly in accordance with the availability of the resources in a multiprocessor computer that acts as client. In that case also, the resource manager and the resource scheduler are distributed to separate processors and run independently in other computers on the network so that resources can be provided and used promptly and efficiently.

Optional combinations of the aforementioned constituting elements, and implementations of the invention in the form of methods, apparatuses, systems, computer programs, recording media storing computer programs, and data structures may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

BEST MODE FOR CARRYING OUT THE INVENTION

The invention will now be described by reference to the preferred embodiments. This does not intend to limit the scope to of the present invention, but to exemplify the invention.

Embodiment 1

A network computing system in the embodiment is provided with a plurality of computers, which have a plurality of processors built-in, connected to a network.

The collaboration of computers delivers real-time resource management in the embodiment.

First, a detailed description is given of a basic configuration of each computer having a plurality of processors built-in, followed by the description on the whole system.

Figure 1:
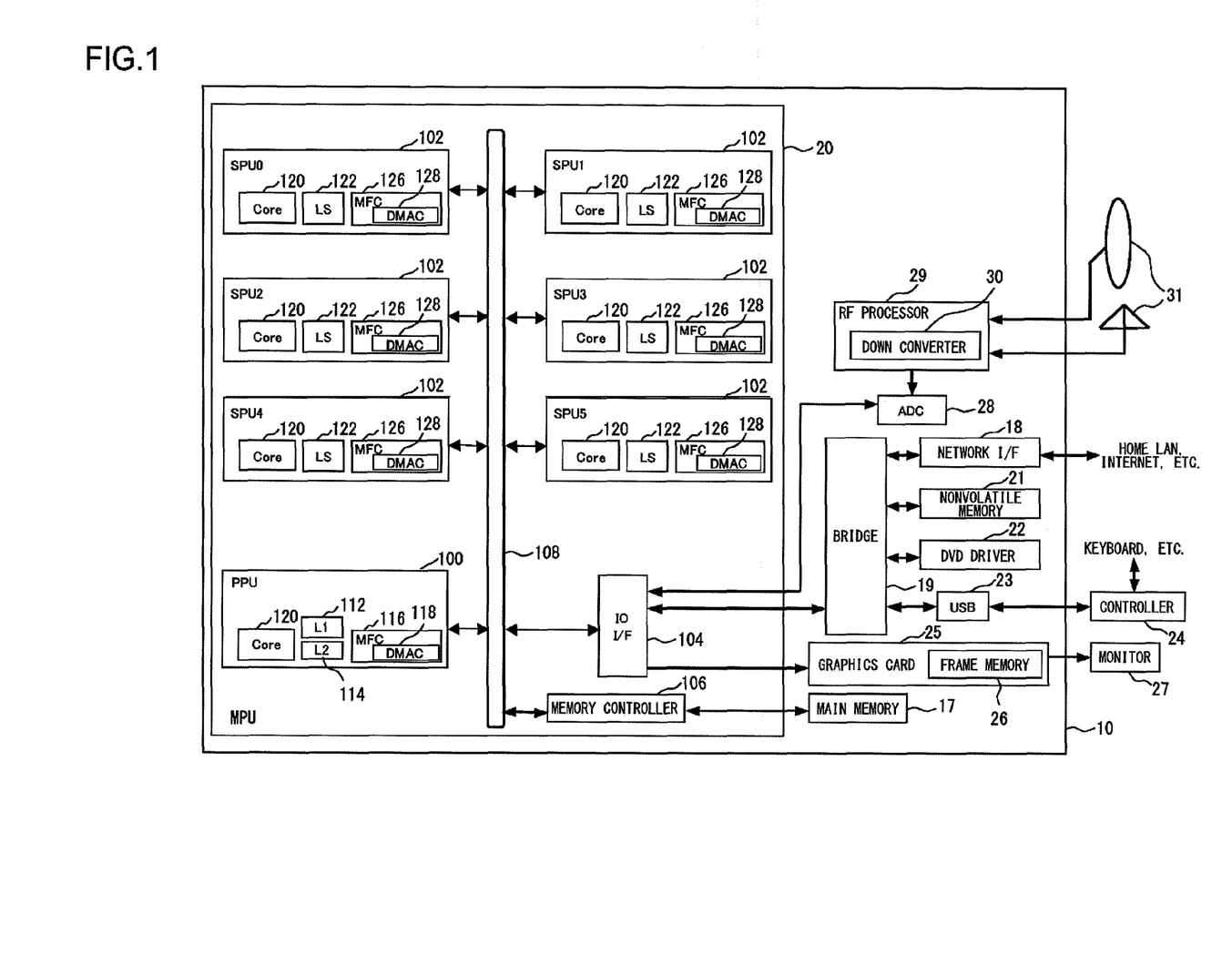
FIG. 1 is a diagram showing an example of a basic configuration of a network computer using a one-chip multiprocessor.

FIG. 1 shows an example of a basic configuration of a network computer using a one-chip multiprocessor. A network computer 10 is provided with a multiprocessor 20, an RF processor 29, an AD converter 28, a bridge 19, a network interface 18, a nonvolatile memory 21, a DVD driver 22, a USB 23, a graphics card 25, a main memory 17, an antenna 31, a controller 24, and a monitor 27.

The multiprocessor 20 is provided with a main processor 100, a plurality of sub-processors 102, an I/O interface 104, and a memory controller 106 and has a configuration where all of these are connected to a ring bus 108 and each of them runs in parallel. The multiprocessor 20 in the embodiment includes six processors as sub-processors 102. Each sub-processor 102 is given an ID, for example, "SPU0" and "SPU1", that identifies the sub-processor uniquely on a ring bus 108 so that both a processor that makes a request via the ring bus 108 and a processor that receives the request can be identified.

The memory controller 106 is connected to the main memory 17. It also serves as a mediator for the access of each sub-processor 102 to the main memory 17. In the embodiment, a detailed description is given of an example where the main memory 17 is provided outside of the multiprocessor 20. However, as an exemplary variation, it may have a configuration where the main memory 17 is included inside of the multiprocessor 20. The I/O interface 104 is connected to, for example, a bridge 19 for the connection with various I/O devices, a graphics card 25, an RF processor 29 for processing wireless communication, and it mediates the control over external devices and the communication with external devices by the main processor 100 and the sub-processor 102.

The bridge 19 is connected to the network interface 18, the nonvolatile memory 21, the DVD driver 22, and the USB 23. The network interface 18 mediates the communication with a network such as household LAN and internet. The USB 23 mediates the connection with peripheral devices such as a keyboard via a controller 24. The graphics card 25 includes a frame memory 26 and outputs an image signal to a monitor 27. The RF processor 29 includes a down-converter 30 and is also connected to the I/O interface 104 via an AD converter 28. The RF processor 29 establishes wireless communication with outside via an antenna 31.

The main processor 100 includes a processor core 110, an L1 cache 112, an L2 cache 114, and a sub-memory controller 116. The sub-memory controller 116 has a DMAC (Direct Memory Access Controller) 118 built-in. In the main processor 100, operating system (hereinafter referred to as "OS") runs and a plurality of sub-processors 102 run based on the basic process of the OS.

Each of a plurality of sub-processors 102 includes a processor cores 120, a local memory 122, and a sub-memory controller 126. The sub-memory controller 126 has a DMAC 128 built-in. Since each of a plurality of sub-processors 102 has an intrinsic local memory 122, once a target program is loaded into the local memory 122, a target process can be continued without accessing the main memory 17 from that point on unless otherwise required. Also, since the sub-processor 102 is designed not to cause the suspension of a process resulting from an interruption, it is suitable for implementation of various processes (will be hereinafter described) in high speed and for distributed processing of the use and provision of resources on network.

In the sub-processor 102, a program that is a part of OS, for example, a part of a device driver or system program may be executed. The OS that is specialized in controlling the whole sub-processor 102 may also run in the sub-processor 102. The main processor 100 and the sub-processor 102 are configured in instruction set architectures (ISA), each having different instruction sets. While in the main processor 100, a program that manages the use of the resources included in its computer is executed, in the sub-processor 102, a program (will be described hereinafter) that manages the use and provision of the resources included in other computers on the network.

Figure 2:
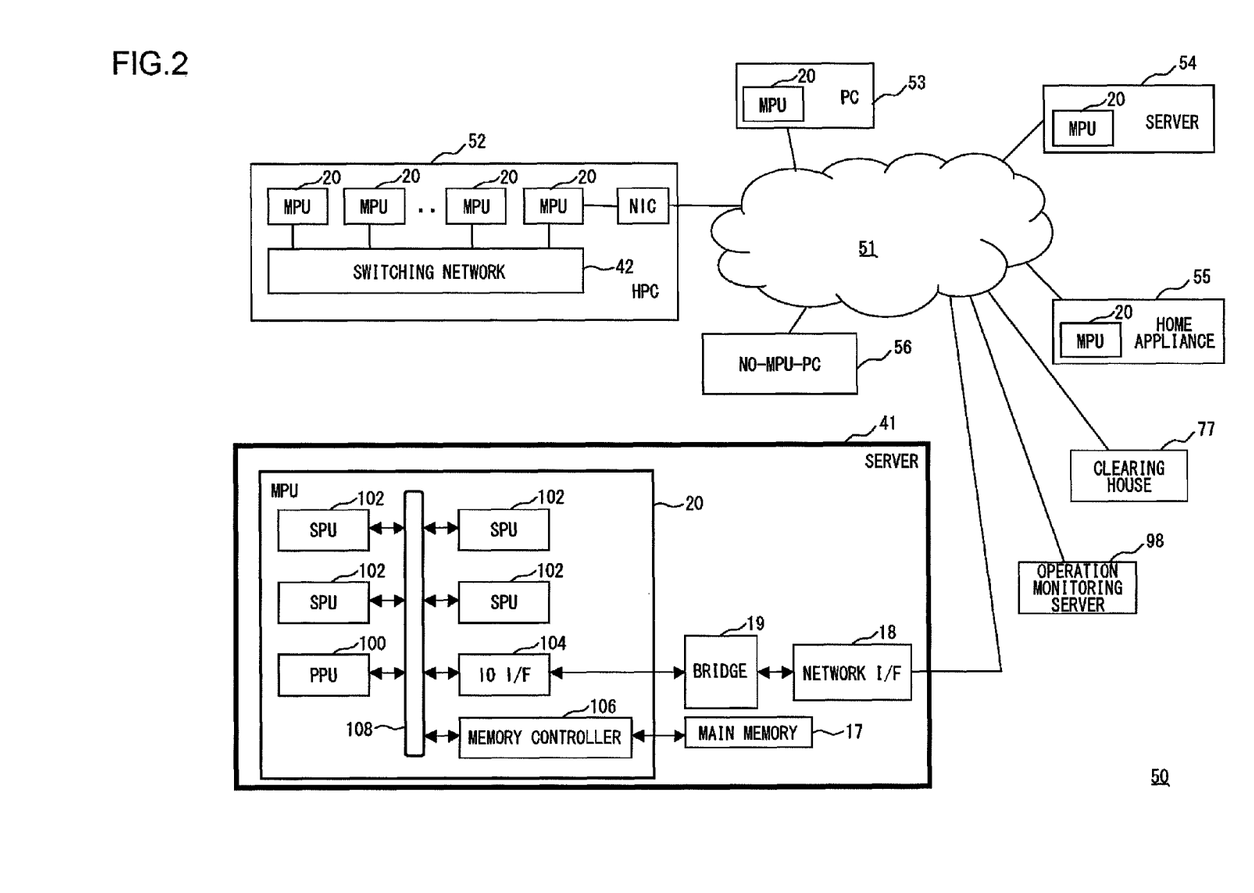
FIG. 2 is a diagram showing an example of a network computing system in the embodiment.

FIG. 2 is an example of a network computing system in the embodiment. A network computing system 50 includes a server 41 and a server 54, each including a multiprocessor 20, a high-performance computer 52 including a plurality of multiprocessors 20 connected via a switching network 42, a personal computer 53 including a multiprocessor 20, a home appliance 55 including a multiprocessor 20, and a personal computer 56 connected to a network 51, including a processor other than a multiprocessor 20. The network 51 may be Internet or may be LAN such as a home network. The configuration of the network computing system 50 in the figure is for illustrative purposes. The hardware configuration and the number of its units connected to the network 51 are arbitrary.

Although the multiprocessor 20 in the server 41 includes a plurality of sub-processors 102 and one main processor 100, the configurations included in the server 41 is basically same as the configurations included in the network computer 10 in FIG. 1. A process for performing real-time resource management of the embodiment runs on the server 41 in each sub-processor 102. For example, a program of the resource manager runs on a first sub-processor 102, a program of the resource scheduler runs on a second sub-processor 102, and a program of the resource management client runs on a third sub-processor 102. As an exemplary variation, it may have a configuration in which the program of the resource manager runs on one of the plurality of sub-processors included in the server 41 and the program of the resource scheduler runs on one of the sub-processors 102 include in the server 54. The resource management client may run on all the computers included in the network computing system 50.

A clearing house 77 records the state of usage and provision of resources at each computer and processes the billing for the usage. An operation monitoring server 98 manages the result and efficiency of the allocation in response to a request for use of a resource. A description is given of the operations of the resource manager, the resource scheduler, and the resource management client, followed by the description of the operations of the clearing house 77 and the operation monitoring server 98 in the following.

(Resource Manager)

The resource manager in the embodiment is a process that runs on a sub-processor 102 so as to manage whether the computing resources such as a multiprocessor 20 and a sub-processor 102 included in a multiprocessor 20 in any of the computers connected to the network 51 can be provided to the other computer. When any of the computing resources is available to be provided to other computers, the resource manager receives resource information via the network 51 from the computer having the resource that can be provided.

The resource manager runs in corporation with the resource scheduler that will hereinafter be described. The resource manager in the embodiment receives from the resource scheduler a request for use of a resource and responds to the resource scheduler by performing the process of allocating the resource specified by the request. When allocating distributed resources to a plurality of computers in response to the request for use of the resources, the resource manager separates the request for use in accordance with respective specifications of the computers and responds to the resource scheduler.

The resource manager has a resource management table for classifying the resources that can be provided according to a resource type. The resource manager reduces, for example, the value of a resource counter that is the number of resources that can be allocated for every resource type every time resource allocation is performed. This prevents the allocation of a plurality of resources on a specific computer and the repetition of allocation of the resources on the same computer. Thus, intensive load to a specific computer can be prevented.

When resources cannot be allocated in response to the request for use of the resources, the resource manager returns to the resource scheduler a response indicating that allocation cannot be performed. In the exemplary example, the resource manager retains a manager management table for managing at least a part of the resource manager that runs on a sub-processor on the same or different server. The resource manager generates resource amount information that indicates the amount of resources managed in a resource management table and exchanges the resource amount information periodically with other resource managers managed in the manager management table. The resource manager refers to the manager management table, selects the resource manager that manages more resources that are available, and returns the identification information of the selected resource manager to the corresponding resource scheduler.

(Resource Scheduler)

The resource scheduler in the embodiment is a process that is performed while occupying one sub-processor. Upon the receipt of a request for use of a resource from any one of the computers connected to the network 51, the resource scheduler transmits the request for use asynchronously to the resource manager. The resource scheduler waits until the resource is allocated in response to the transmitted request for use and, after the resource is allocated by the resource manager, forwards the request for use to the computer that has the allocated resource. When there are a plurality of computers that have the resources, the resource manager separates the request for use into a plurality of requests for use, and the resource scheduler forwards the requests for use to the corresponding computers. Preferably, a scheduling queue is kept in a local memory 122 in a sub-processor 102 on which the resource scheduler runs. However, it may be kept in a main memory 17.

Any scheduling methods of a skilled person's knowledge can be employed for a scheduling algorithm for the resource scheduler. For example, a FIFO scheduling may be employed which processes requests for use in order of arrival. In the FIFO scheduling, when the resource manager cannot allocate the resource in response to the request for use of the resource, information indicating that the allocation is unavailable is transmitted to the computer of the origin of the request for use in a way the request for use can be identified. Also, as another scheduling method, the resource manager may transmit, when the identification information of another resource manager from the corresponding manager is received, a request for use to the resource manager asynchronously, and the resource manager may transmit, when a response is received in response to the request for use, a request for use to a computer having the resource in accordance with the allocation. As another scheduling method, a method to process based on the priority may be employed. In this case, the request for use that includes more resource restrictions may be given a priority to be processed. Contrarily, the request for use that includes less resource restrictions may be given a priority to be processed. Also, giving a priority to the request for use, the order of processing may be determined in accordance with the priority. In this case, a scheduling queue in accordance with the priority may be kept.

(Resource Management Client)

The resource management client in the embodiment is the process that runs as a client on the computer included in the network computing system in the embodiment. The resource management client has, for example, at least three roles in the following.

(1) The resource management client transmits, when a resource becomes available to be provided externally in a multiprocessor 20 managed by the resource management client, to any of the resource managers available resource information indicating the details of a resource that can be provided. The same applies when the resource management client manages a plurality of multiprocessors. For example, in the high-performance computer 52 in FIG. 2, the resource management client may run only on the multiprocessor connected to a network interface NIC and manage all the resources of the multiprocessors connected to a switching network 42.

(2) When there is a shortage of resources on the computer on which the resource management client runs, the resource management client transmits a request for use to any of the resource schedulers on the network 51.

(3) Upon the receipt of a request for use from other computers, the resource management client allocates the resource included in the multiprocessor 20 under its management to the computer of the origin of the request for use.

In a computer as in a personal computer 56 shown in FIG. 2 which has processors other than the multiprocessor 20 built-in, a stripped-down resource management client for which the roles of the above descriptions (1) and (2) are omitted runs and issues a request for use on the network 51 to which a plurality of computers having multiprocessors 20 built-in are connected so that the process is performed by the computers having the multiprocessors 20 built-in instead.

Figure 3:
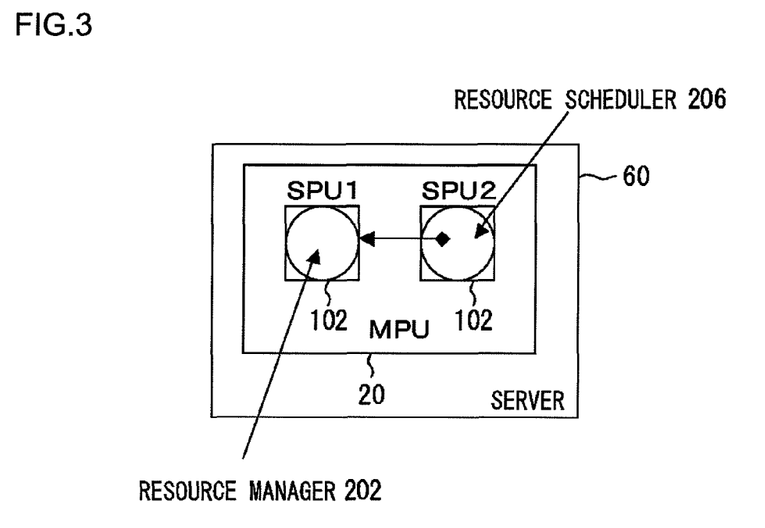
FIG. 3 is a diagram showing the example of a resource manager and a resource scheduler, each working in a server including one multiprocessor.
Figure 4:
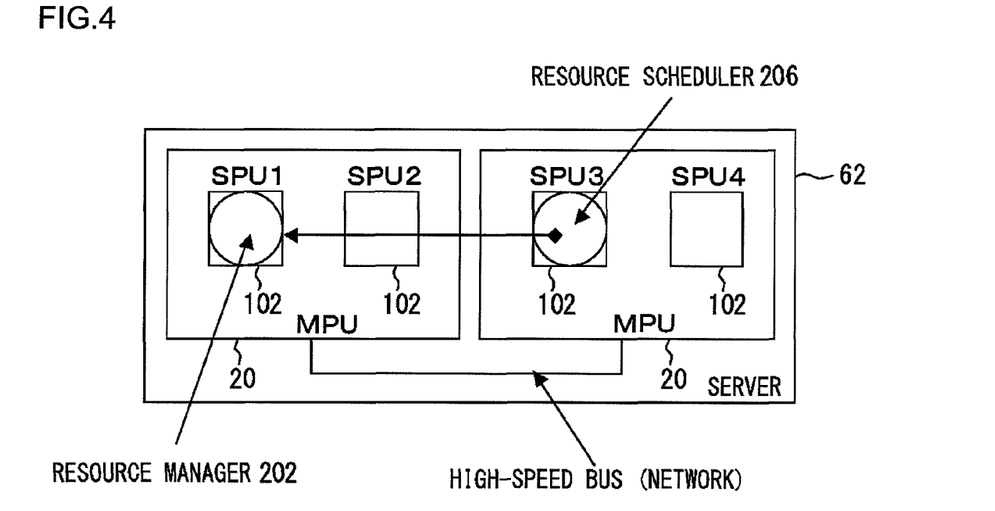
FIG. 4 is a diagram showing the example of a resource manager and a resource scheduler, each working in a server including two multiprocessors connected to each other via a high-speed network or a high-speed bus.
Figure 5:
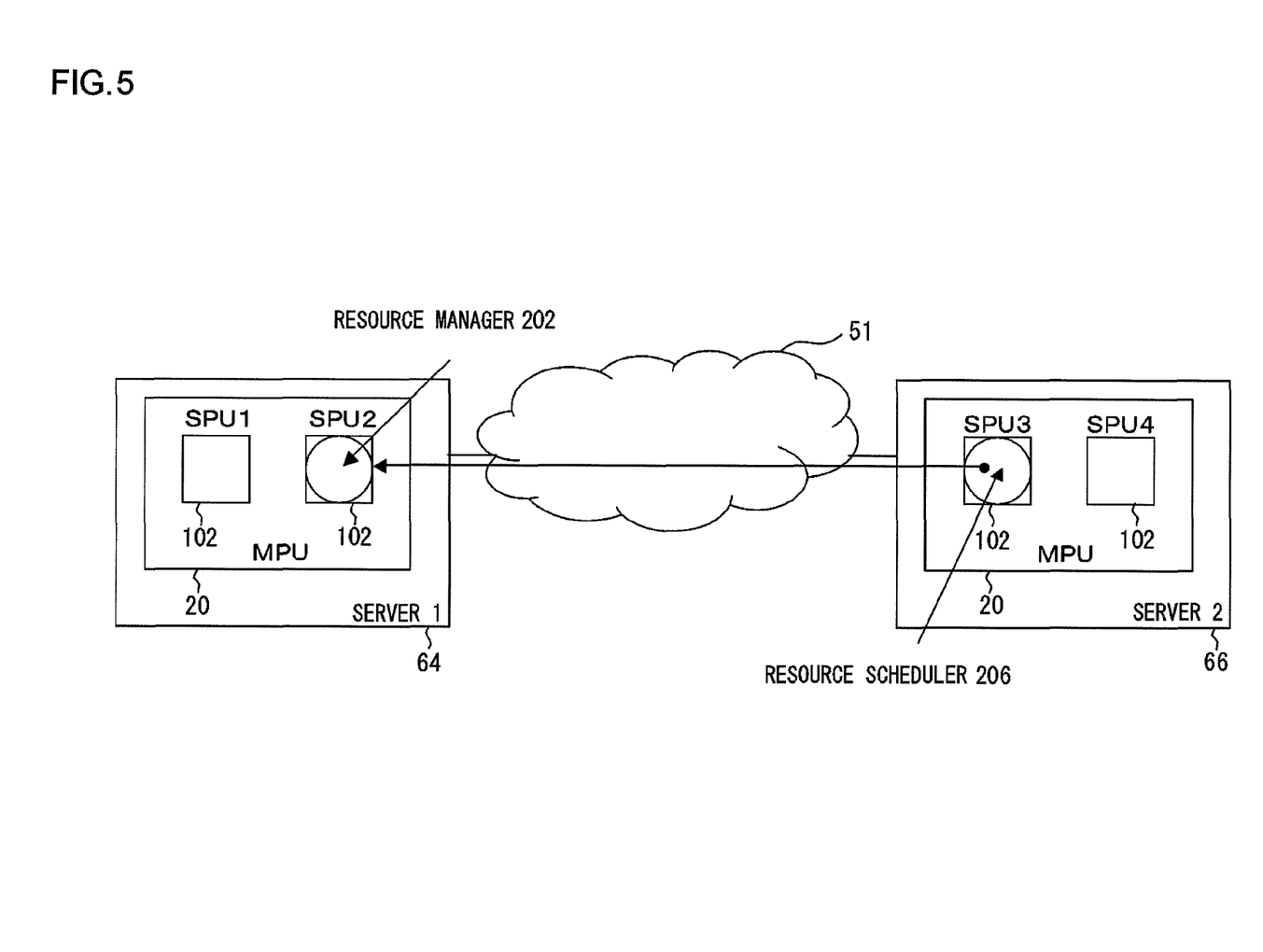
FIG. 5 is a diagram showing the example of a resource manager and a resource scheduler, each running on a respective sub processor in two servers distributed on a network.

FIGS. 3-5 show the examples of three processes, a resource manager, a resource scheduler, and a resource management client, arranged on at least one multiprocessor server.

FIG. 3 shows the example of a resource manager and a resource scheduler, each working in a server 60 including one multiprocessor 20. In the example of the figure, of the two sub-processors 102 included in the multiprocessor 20, a resource manager 202 runs in a sub-processor 102 with a "SPU1" ID, and a resource scheduler 206 runs in a sub-processor 102 with a "SPU2" ID.

FIG. 4 shows the example of a resource manager and a resource scheduler, each working in a server 62 including two multiprocessors 20 connected to each other via a high-speed network or a high-speed bus. In the example of the figure, two sub-processors 102 are selected, one from each of the two multiprocessors 20, and a resource manager 202 and a resource scheduler 206 run on the respective sub-processors. In other words, a resource manager 202 runs in a sub-processor 102 with a "SPU1" ID included in one multiprocessor 20, and a resource scheduler 206 runs in a sub-processor 102 with a "SPU2" ID included in the other multiprocessor 20. The two multiprocessors 20 are connected via a high-speed bus or a high-speed network.

FIG. 5 shows the example of a resource manager and a resource scheduler, each running on a respective sub-processor 102 in two servers 64 and 66 distributed on a network 51. In the example of the figure, two sub-processors 102 are selected, one from each of the two servers 64 and 66, and the resource manager 202 and the resource scheduler 206 run on respective sub-processors. In other words, the resource manager 202 runs on the sub-processor 102 with a "SPU2" ID included in the multiprocessor 20 of one server 64, and the resource scheduler 206 runs on the sub-processor 102 with a "SPU3" ID included in the multiprocessor 20 of the other server 66.

Comparing the examples of FIGS. 3-5 described above, the communication efficiency increases in the order from FIG. 3 to FIG. 4 to FIG. 5. In the embodiment, the resource manager 202 and the resource scheduler 206 run independently in a substantially asynchronous manner so that they can run in any embodiments in FIGS. 3-5 without changing the basic principle.

Figure 6:
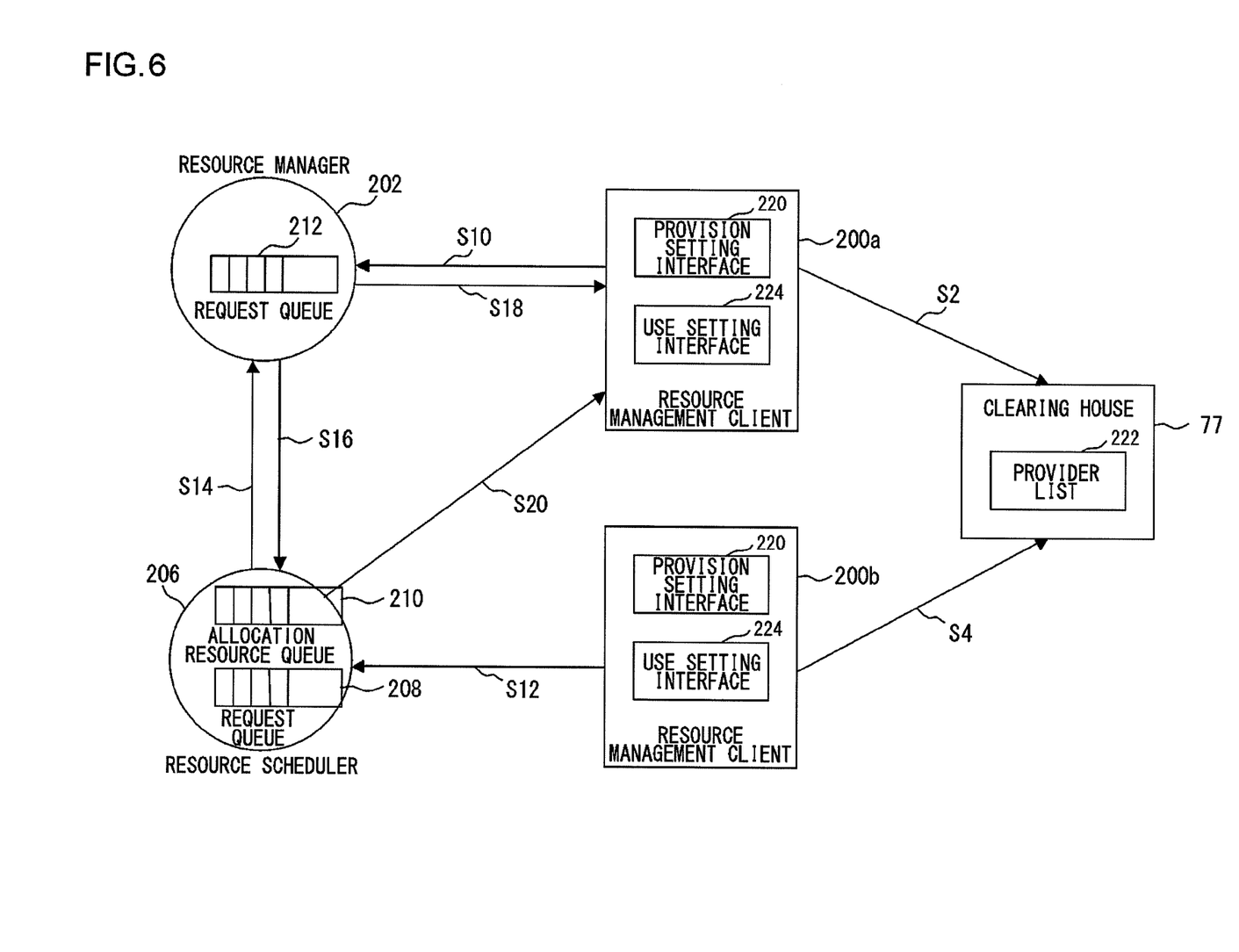
FIG. 6 is a diagram showing the processing sequence in three processes: a resource scheduler, a resource manager, and a resource management client.

FIG. 6 shows the processing sequence in three processes: a resource scheduler, a resource manager, and a resource management client. Only one clearing house 77 is shown in the figure. However, a plurality of clearing houses 77 may be included in the network 51 as an exemplary variation.

(Authentication of the Resource Management Client)

The clearing house 77 only accepts information from the authenticated resource management client 200 and rejects false information. The authentication of the resource management client 200 is performed when the resource management client 200 first accesses a predetermined clearing house 77. In this authentication process, the resource management client 200 transmits a certification, which proves that the software is developed legitimately, or transmits a resource management client ID. When the certification is correctly authenticated by the clearing house 77, an electronic signature is transmitted to the resource management client 20. The resource management client 200 transmits a message to which the electronic signature attached in the case of communicating with the clearing house 77.

(Registration of a Resource Provider)

A resource provider sets whether a part or all of the resources of the computer should be provided to other computers via a provision setting interface 220. The provision setting interface 220 may be provided integrally with the resource management client 200, or it may be provided as a software separated from the resource management client 200. The provision setting interface 220 calculates the estimated value of dividends to be paid when the resources being provided are used by other computers and displays the estimated value on the computer screen. Upon the confirmation of the displayed estimated value, the resource provider sets via the provision setting interface 220 the amount of resources to be provided such as the number of sub-processors, the number of multiprocessors, a memory capacity, and the duration for the provision. The provision setting interface 220 of a resource management client 200a that runs on the resource provider's computer forwards via the network 51 to the clearing house 77 the resource provision details that is set, the computer identification information, and the available resource information including the personal information of the provider (S2). The computer identification information is an IP address provided to the computer, for example, in the network 51. The personal information of the provider is the information, for example, the name of the provider, the contact information such as a phone number and an email address, and an account number and a credit card number, which is necessary for the identification of the provider and for the payment for the usage to the provider. Preferably, the communication between the computer and the clearing house 77 is kept secured. The clearing house 77 writes the information received from the provision setting interface 220 in a provider list 222 that shows the providers of the resources being managed.

(Registration of a Resource User)

One who wishes to use a resource inputs the setting for sign up with the clearing house 77 via a use setting interface 224. The use setting interface 224 may be provided integrally with the resource management client 200, or it may be provided as a software separated from the resource management client 200. One who wishes to use a resource signs up with the clearing house 77 through a use setting interface 224 via the resource management client 200b that runs on the computer in advance. For the sign up, information required for identifying the user and for charging the user for the usage fee, for example, the name of the provider, the contact information such as a phone number and an email address, and an account number and a credit card number is registered to the clearing house 77 (S4). Upon the successful registration of the information to the clearing house 77, the clearing house 77 transmits to the resource user's computer the electronic signature for uniquely identifying and authenticating the resource user.

(Steps of Provision and Use of a Resource)

First, the resource management client 200a of the computer in which an unused resource becomes available to be provided transmits the available resource information for registering the unused resource to the selected resource manager 202 (S10).

The resource management client 200b of the computer that has detected resource shortage (e.g., the shortage of sub-processors) issues, in order to request the use of an unused resource of other computer, a request for use to the selected resource scheduler 206 (S12). The request for use then enters a request queue 208 in the resource scheduler 206. When transmitting the request for use, the resource management client 200b reads out the electric signature from a storage area where the electric signatures of resource users are stored and transmits the electric signature to the resource scheduler 206 along with the request for use. In the example of the figure, the request queue 208 is implemented as a FIFO queue. For the resource scheduler 206, the process is performed while occupying the sub-processor 102. The request queue 208 may be located in a local memory 122 in the sub-processor 102 or may be located in the main memory 17.

The resource scheduler 206 extracts the request for use from the head of the request queue 208 and transmits asynchronously the request for use to the corresponding resource manager 202 (S14). In other words, the resource scheduler 206, without waiting for the response from the resource manager 202 for the request for use, extracts the next request for use from the request queue 208 if an allocation resource queue 210 is empty, processes the request for use that has been taken out, and proceeds to S16 if the allocation resource queue 210 is not empty. For the resource scheduler 206, the process is performed while the resource scheduler occupying the sub-processor 102. The allocation resource queue 210 may be located in the local memory 122 in the sub-processor 102 or may be located in the main memory 17. The resource manager 202 adds the request for use received from the resource scheduler 206 to the request queue 212.

The resource manager 202 extracts the request for use from the head of the request queue 212, selects the appropriate resource from the unused resources being managed and allocates accordingly, and returns resource allocation information that indicates the result of the allocation to the resource scheduler 206 which is the request for use source (S16). The resource allocation information is a plurality of request for use packets formed as a result of the division of the original request for use and has the computers of the resources allocated as the destinations. The plurality of the request for use packets enter the allocation resource queue 210. In the case of the resource manager 202, the process is performed while the resource manager occupying the sub-processor 102. However, the request queue 212 may be located in the local memory 122 in the sub-processor 102 or may be located in the main memory 17.

The resource scheduler 206 extracts the request for use packet from the head of the allocation resource queue 210 if the allocation resource queue 210 is not empty and forwards the request for use packet to the resource management client 200a of the computer having an unused resource to which the allocation is made (S18). In the computer providing the resource to which the request for use packet is received, the resource management client 200a allocates a resource corresponding to the request for use and performs the requested process.

Upon the successful completion of the process requested by the resource scheduler 206, the resource management client 200b transmits to the clearing house 77 the request for use and the information for identifying a destination computer of the request for use. The clearing house 77 that has received the request for use performs the process, in accordance with the amount of resources allocated in response to the requests for use, to charge the usage fee to users identified by the electronic signatures of the resource users included in the requests for use. On the other hand, an account number or a credit card number is extracted from the personal information of the resource provider identified by the identification information of a computer to which the request for use is transmitted, and instruction is issued instructing to make a payment to the account identified by the information for the usage fee determined in accordance with the amount of the resource allocated in response to the request for use. The amount of the usage fee to be paid to the provider of the resource that has been used is set so that it does not exceed the amount of the usage fee charged to the resource user.

(Selection of the Resource Manager in Accordance with a Resource-Allocation Result)

Figure 7:
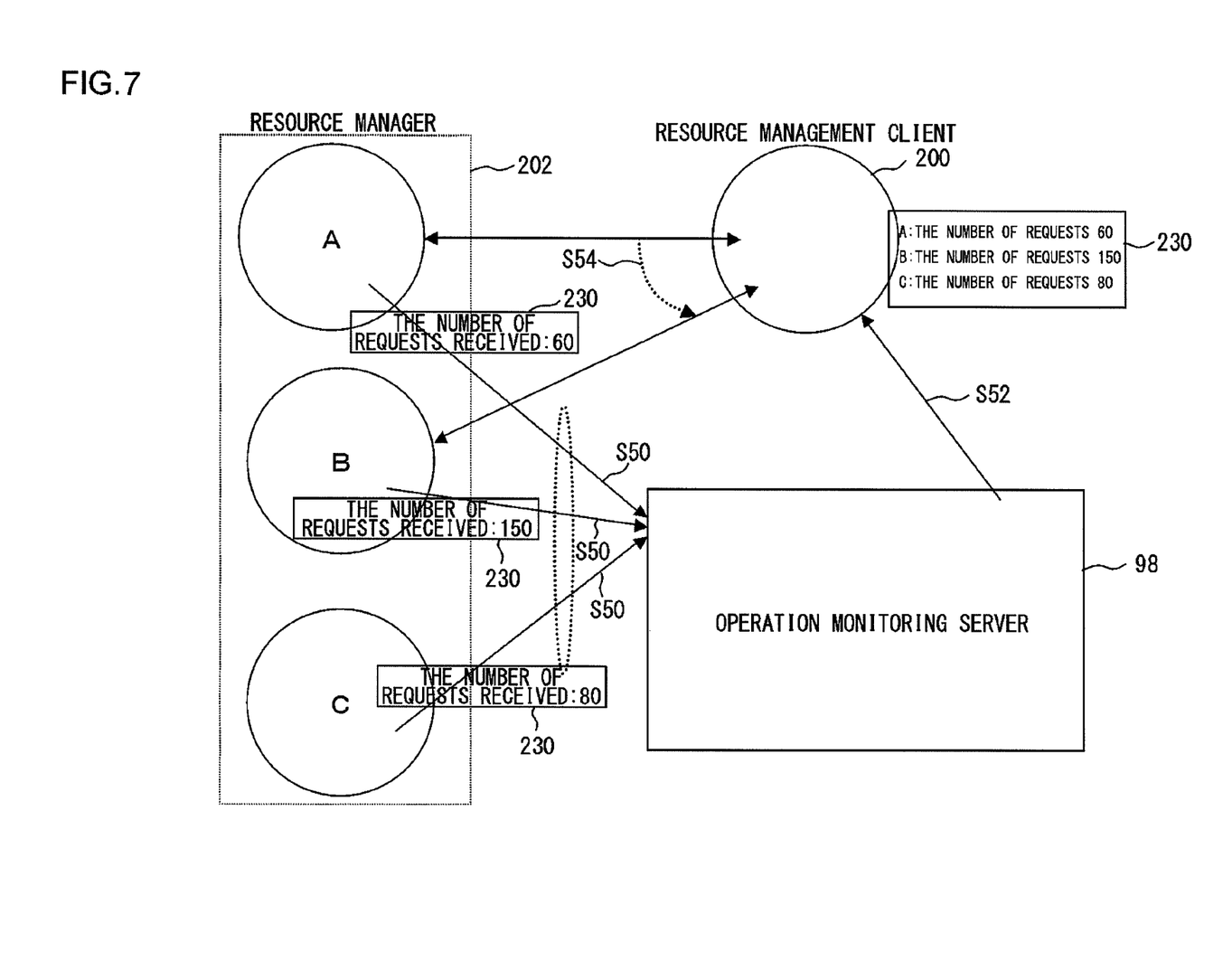
FIG. 7 is a diagram explaining the arrangement where a resource management client selects a resource manager in accordance with the resource-allocation result while an operation monitoring server serving as a mediator.

FIG. 7 is a diagram explaining the arrangement where a resource management client 200 selects a resource manager 202 in accordance with the resource-allocation result while an operation monitoring server 98 serving as a mediator. The operation monitoring server 98 receives a resource-allocation result 230 every constant period from at least one resource manager 202 that runs on the sub-processor of the server connected to the network 51 (S50) and manages the resource-allocation result 230. The resource-allocation result 230 obtained every constant period of time includes, for example, the number of the requests for use received in every constant period of time and the amount of resources successfully allocated in every constant period of time. In the example of the figure, the resource-allocation result 230 showing that the number of the requests for use in a constant period of time is 60 is transmitted from a computer A, the resource-allocation result 230 showing that the number of the requests for use in a constant period of time is 150 is transmitted from a computer B, and the resource-allocation result 230 showing that the number of the requests for use in a constant period of time is 80 is transmitted from a computer C. The resource management client 200 receives the resource-allocation result 230 of each computer from the operation monitoring server 98 (S52) and refers to the resource-allocation result in order to select the resource manager with the best resource operation efficiency.

The resource provider receives the usage fee in dividends in accordance with the amount of resources used. The more unused resources are used which are offered to be used by others, the more dividends the provider can receive. Thus, in order for the resource provider to receive the most dividends, any of the resource managers 202 with the best resource-allocation results is selected and the selection of the resource manager 202 is switched in accordance with the change in the resource-allocation result (S54).

The resource management client 200 may automatically switch the resource manager 202 in accordance with the resource-allocation result or may switch it based on the explicit instruction from the resource provider. In switching the resource manager 202 based on the explicit instruction from the resource provider, the resource management client 200 receives the explicit selection instruction from the resource provider after presenting to the resource provider a list including the ID's of the available resource managers and the resource-allocation results 230.

(Selection of the Resource Scheduler in Accordance with a Scheduling-Efficiency Result)

Figure 8:
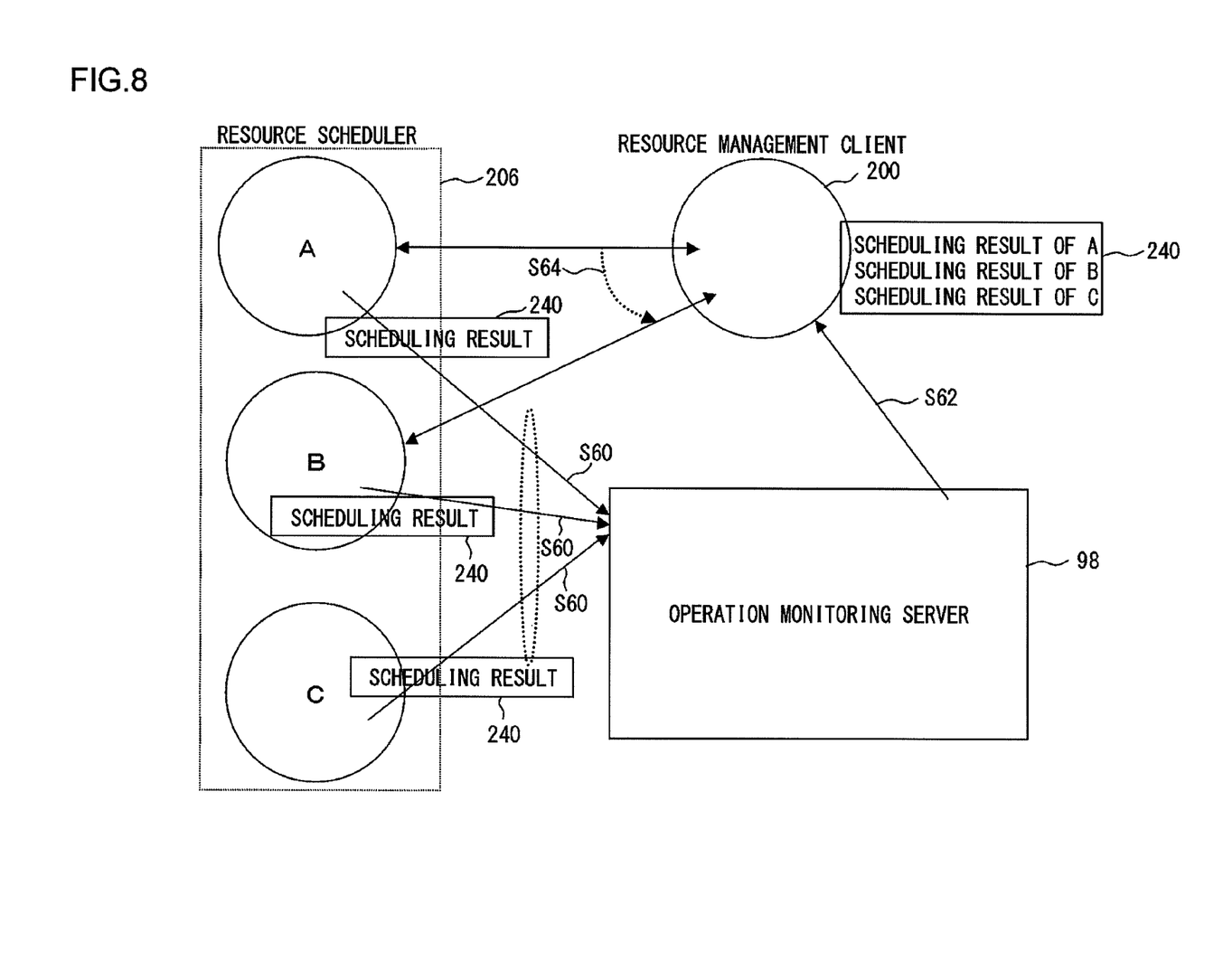
FIG. 8 is a diagram explaining the arrangement where a resource management client selects a resource scheduler in accordance with a scheduling-efficiency result while an operation monitoring server serving as a mediator.

FIG. 8 is a diagram explaining the arrangement where a resource management client 200 selects a resource scheduler 206 in accordance with a scheduling-efficiency result while the operation monitoring server 98 serving as a mediator. The operation monitoring server 98 receives a scheduling-efficiency result 240 every constant period of time from at least one resource scheduler 206 that runs on the sub-processor of the server connected to the network 51 (S60) and manages the scheduling-efficiency result 240. The scheduling-efficiency result 240 may be average waiting time it takes for a resource to be allocated after a request for use is issued in scheduling or it may be a successful rate for request allocation. The resource management client 200 receives the scheduling-efficiency result 240 of each computer from the operation monitoring server 98 (S62) and refers to the scheduling-efficiency result 240 in order to select the resource scheduler 206 with better scheduling efficiency.

The resource user prefers the allocation of resources with less interruption. Thus, in order for the resource user to be allocated the resources more efficiently, any of the resource schedulers 206 with higher scheduling-efficiency result is selected and the selection of the resource scheduler 206 is switched in accordance with the change in the scheduling-efficiency result (S64).

The resource management client 200 may automatically switch the resource scheduler 206 in accordance with the scheduling-efficiency result or may switch it based on the explicit instruction from the resource user. In switching the resource scheduler 206 based on the explicit instruction from the resource user, the resource management client 200 receives the explicit selection instruction from the resource user after presenting to the resource user a list including the ID's of the available resource schedulers and the scheduling-efficiency results 240.

Second Embodiment

The embodiment differs from the first embodiment in that the usage charge is adjusted between the resource user and the resource provider by exchanging resources with predetermined points. In other words, points are given to the resource provider and he/she can use other resources by redeeming the points in the embodiment. Thus, the exchange of the resources can be practically achieved by using these points. The "points" play a role of virtual currency to pay for the usage charge of the resources and can be converted to a resource amount. The "resource amount" includes not only the number of sub-processors, the amount of memory, and the amount of hardware resources (e.g., devices such as peripheral devices and WiFi device drivers) but also the concept of the duration of resource use (e.g., WiFi device driver occupancy time).

Figure 9:
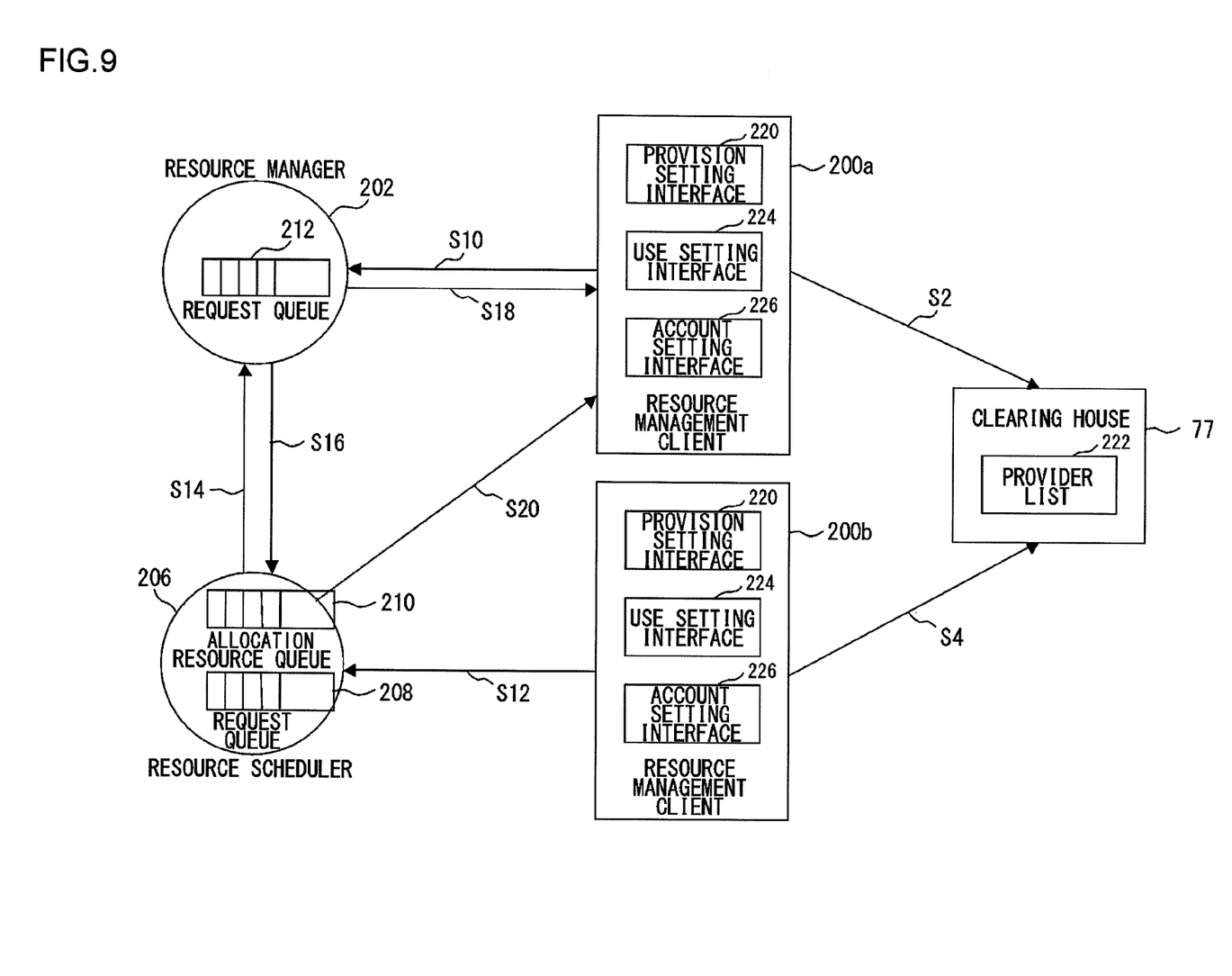
FIG. 9 is a diagram showing the processing sequence in three processes: a resource scheduler, a resource manager, and a resource management client in the second embodiment.

FIG. 9 shows the processing sequence in three processes: a resource scheduler, a resource manager, and a resource management client in the second embodiment. A description will now be given mainly of the differences from the first embodiment in the following. The similarity is omitted in the following description.

(Registration of a Point Account)

A computer owner to be the resource provider and user signs up with the clearing house 77 by opening via an account setting interface 226 a point account for the resource exchange in advance. The account setting interface 226 forwards via the network 51 to the clearing house 77 the identification information of the computer and the personal information of the owner as the information required for sign up. The personal information of the owner is the information, for example, the name of the provider, the contact information such as a phone number and an email address, and an account number and a credit card number, which is necessary for the identification of the owner and for giving the resource exchange points to the owner. Preferably, the communication between the computer and the clearing house 77 is kept secured. The clearing house 77 writes the information received from the account setting interface in a provider list 222 indicating the providers of the resources being managed. The clearing house 77 transmits to the computer for which the point account has been established the electronic signature for uniquely identifying and authenticating the owner. The clearing house 77 identifies the personal information of the owner including the point account by using the electronic signature. The point account may be established in the clearing house 77 or may be established in another server in the network 51. However, when the point account is established in a server other than the clearing house 77, it is necessary for the clearing house 77 to be able to directly access the server.

(Registration of a Resource Provider)

A resource provider sets via a provision setting interface 220 whether a part or all of the resources of the computer should be provided to other computers. The provision setting interface 220 in the embodiment calculates, when a resource being provided is used by other computers, the estimated value of the resource exchange points that can be redeemed when the computer uses resources of other computers and displays the estimated value on a computer screen. The available resource information in the embodiment is forwarded from the provision setting interface 220 to the clearing house 77 along with the electronic signature and is written in the provider list 222 in the clearing house 77.

(Registration of a Resource User)

One who wishes to use resources needs to have points that can be exchanged for the resources in his/her point account in advance.

The resource management client 200b that runs on the computer that detects resource shortage (e.g., the shortage of sub-processors) checks in the point account to determine whether there are enough points for the exchange with the resources which are running short. When there are enough points, the resource management client 200b transmits a request for use to the resource scheduler 206. When transmitting the request for use, the resource management client 200b reads out the electric signature from a predetermined storage area and transmits the electric signature to the resource scheduler 206 along with the request for use.

Upon the successful completion of the process requested by the resource scheduler 206, the resource management client 200b transmits to the clearing house 77 the request for use and the information for identifying the destination computer of the request for use. The clearing house 77 that has received the request for use identifies, in accordance with the amount of resources allocated in response to the requests for use, the user by the electronic signature included in the request for use and deduct the points from the user's point account. On the other hand, the clearing house 77 extracts the identification information of the point account from the personal information of the resource provider identified by the identification information of the destination computer of the request for use and issues an instruction to add to the point account the points determined in accordance with the amount of resources allocated by the request for use. Preferably, the resource exchange points to be added to the provider of the used resource is set so as not to exceed the resource exchange points taken away from the resource user.

Described above is an explanation based on the embodiments of the present invention. These embodiments are intended to be illustrative only and it will be obvious to those skilled in the art that various modifications to constituting elements and processes could be developed and that such modifications are also within the scope of the present invention. Some such examples are shown in the following.

In the first and second embodiments, an asymmetric multiprocessor is explained with an example as the multiprocessor 20 installed on the network computer 10. In an exemplary variation, the configuration may be employed where a symmetric multiprocessor is installed on the network computer 10.

Figure 10:
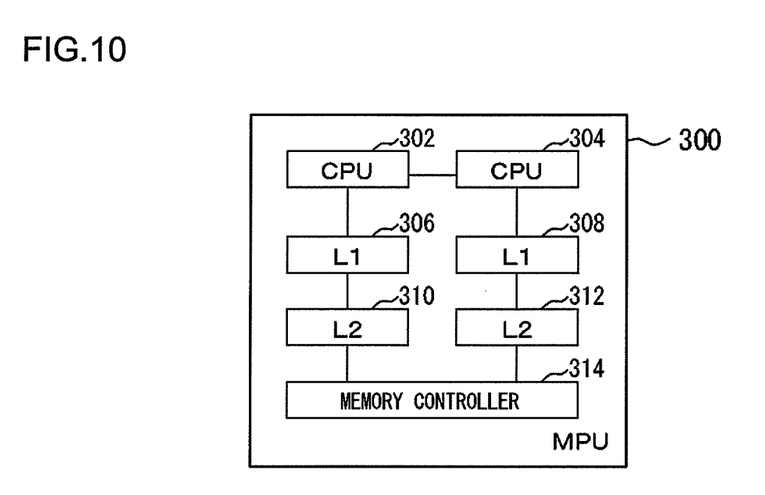
FIG. 10 is a diagram showing the configuration of a one-chip multiprocessor in the first exemplary variation.

FIG. 10 shows the configuration of a one-chip multiprocessor in the first exemplary variation. The multiprocessor 300 shown in the figure is installed on the network computer 10 instead of the multiprocessor 20 in FIG. 1. The multiprocessor 300 includes a first processor 302, a second processor 304, a first L1 cache 306, a second L1 cache 308, a first L2 cache 310, a second L2 cache 312, and a memory controller 314. The first processor 302, the first L1 cache 306, the first L2 cache 310, and the memory controller 314 are connected to one another and run as a processor unit that replaces the main processor 100 or the sub-processor 102 in FIG. 1. Similarly, the second processor 304, the second L1 cache 308, the second L2 cache 312, and the memory controller 314 are also connected to one another and run as a processor unit that replaces the main processor 100 or the sub-processor 102 in FIG. 1. Only one memory controller 314 is installed on the multiprocessor 300 and shared by the unit of the first processor 302 and the unit of the second processor 304. The first processor 302 and the second processor 304 are connected to each other.

As shown in the figure, a combination of the first processor 302, the first L1 cache 306, and the first L2 cache 310 and a combination of the second processor 304, the second L1 cache 308, and the second L2 cache 312 are symmetrically configured via the memory controller 314. The first processor 302 and the second processor 304 may run in a main-sub relationship where one processor assigns a task to the other processor.

Figure 11:
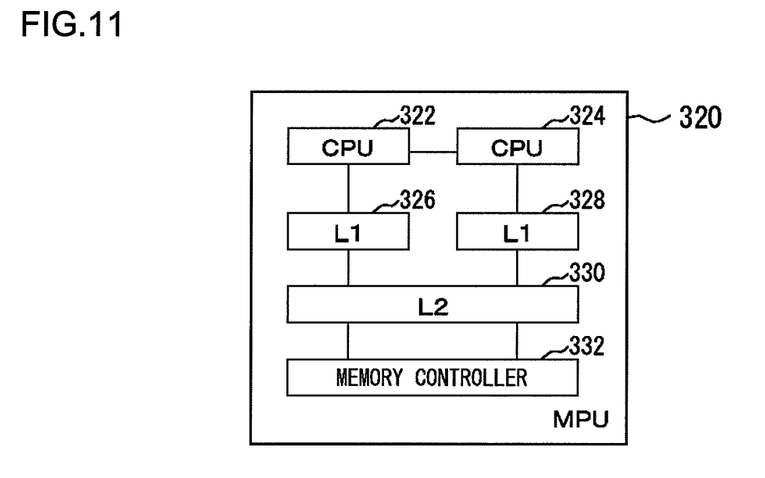
FIG. 11 is a diagram showing the configuration of a one-chip multiprocessor in the second exemplary variation.

FIG. 11 shows the configuration of a one-chip multiprocessor in the second exemplary variation. The multiprocessor 320 shown in the figure is also installed on the network computer 10 instead of the multiprocessor 20 in FIG. 1. The multiprocessor 320 includes a first processor 322, a second processor 324, a first L1 cache 326, a second L1 cache 328, an L2 cache 330, and a memory controller 332. The first processor 322, the first L1 cache 326, the L2 cache 330, and the memory controller 332 are connected to one another and run as a processor unit that replaces the main processor 100 or the sub-processor 102 in FIG. 1. Similarly, the second processor 324, the second L1 cache 328, the L2 cache 330, and the memory controller 332 are also connected and run as a processor unit that replaces the main processor 100 or the sub-processor 102 in FIG. 1. Only one L2 cache 330 and one memory controller 332 are installed on the multiprocessor 320 and shared by the unit of the first processor 322 and the unit of the second processor 324. The first processor 322 and the second processor 324 are connected to each other.

As shown in the figure, a combination of the first processor 322 and the first L1 cache 326 and a combination of the second processor 324 and the second L1 cache 328 are symmetrically configured via the L2 cache 330 and the memory controller 332. The first processor 322 and the second processor 324 may run in a main-sub relationship where one processor assigns a task to the other processor.

In FIGS. 10 and 11, the configuration where two processors are included as a symmetric multiprocessor is explained with examples. However, it may have a configuration where more processors, are included, for example, at least four processors.

INDUSTRIAL APPLICABILITY

A system can be established where hardware resources on a network can be efficiently used.

What is claimed is:

1. A multiprocessor computer comprising:
a multiprocessor including a first processor and a second processor, each having local memory and operating independently; and
a network communication unit operative to transmit and to receive data to and from a computer on a network, wherein
the multiprocessor includes:
the first processor operative to bring a resource manager into operation, the resource manager is loaded in the local memory for receiving hardware resource information that can be provided from a computer on a network via a network, for managing the hardware resource information, and for providing the hardware resource being managed when a request for use of the hardware resource is received; and
the second processor operative to bring a resource scheduler into operation independently from the operation of the resource manager, the resource scheduler is loaded in the local memory for receiving a request for use of a hardware resource from a computer on a network, for managing the request for use of a hardware resource, and for allocating a hardware resource provided by the resource manager as a mediator in response to the request for use of the hardware resource,
wherein the resource manager has a resource management table for managing hardware resources that can be provided from a computer on the network via the network, and a manager management table for managing one or more other resource managers operating on the network, the resource manager generating resource amount information that indicates an amount of resources managed in the resource management table and exchanging the resource amount information with the one or more other resource managers managed in the manager management table.

2. A multiprocessor computer comprising:
a first multiprocessor including a plurality of processors, each having local memory and operating independently;
a second multiprocessor connected to the first multiprocessor via a high-speed bus, including a plurality of processors, each having local memory and operating independently; and
a network communication unit operative to transmit and to receive data to and from a computer on a network, wherein
the first multiprocessor includes a processor running a resource manager, the resource manager is loaded in the local memory for receiving hardware resource information that can be provided from a computer on a network via a network, for managing the hardware resource information, and for providing the hardware resource being managed when a request for use of the hardware resource is received, and
the second multiprocessor includes a processor running a resource scheduler independently from the operation of the resource manager, the resource scheduler is loaded in the local memory for receiving a request for use of a hardware resource from a computer on a network, for managing the request for use of a hardware resource, and for allocating a hardware resource provided by the resource manager as a mediator in response to the request for use of the hardware resource,
wherein the resource manager has a resource management table for managing hardware resources that can be provided from a computer on the network via the network, and a manager management table for managing one or more other resource managers operating on the network, the resource manager generating resource amount information that indicates an amount of resources managed in the resource management table and exchanging the resource amount information with the one or more other resource managers managed in the manager management table.

3. A network computing system including a plurality of computers interconnected via a network, wherein
the plurality of computers includes:
a computer operative, by using any of processors in a multiprocessor including a plurality of processors each having local memory and operating independently, to run a resource manager, the resource manager is loaded in local memory for receiving hardware resource information that can be provided from a computer on a network via a network, for managing the hardware resource information, and for providing the hardware resource being managed when a request for use of the hardware resource is received;

a computer operative, by using any of processors in a multiprocessor including a plurality of processors each having local memory and operating independently, to run a resource scheduler independently from the operation of the resource manager, the resource scheduler is loaded in local memory for receiving a request for use of a hardware resource and for allocating a hardware resource provided by the resource manager as a mediator in response to the request for use of the hardware resource;

a client computer operative to run a resource management client which transmits, when a hardware resource can be provided to other computers, the information of the hardware resource to the resource manager and which transmits, when using a hardware resource of other computers, a request for use of a hardware resource to the resource scheduler; and a clearing house computer operative to receive, from the resource management client, information on an amount of hardware resources provided by a computer on the network to another computer or on an amount of hardware resources used, and information necessary to identify the computer that provides the hardware resources and the computer that uses the hardware resources, and operative to process billing for the usage, wherein the resource manager has a resource management table for managing hardware resources that can be provided from a computer on the network via the network, and a manager management table for managing one or more other resource managers operating on the network, the resource manager generating resource amount information that indicates an amount of resources managed in the resource management table and exchanging the resource amount information with the one or more other resource managers managed in the manager management table.

4. The network computing system according to claim 3, wherein the plurality of computers include an operation monitoring server computer that manages a result of the allocation in response to a request for use of a hardware resource on a network, the resource manager records a resource allocation result including the number of request for use in a predetermined period, transmits the resource allocation result to the operation monitoring server computer and, when the resource manager is selected by the resource management client, receives from the resource management client the information indicating details of an available resource in hardware resources included in the client computer, and the resource management client receives from the operation monitoring server computer the resource allocation result of each of a plurality of resource managers, selects a resource manager with the best result based on the resource allocation results, and transmits the information indicating details of a resource to the selected resource manager.

5. The network computing system according to claim 3, wherein the plurality of computers include an operation monitoring server computer that manages the scheduling efficiency of the resource allocation in response to a request for use of a hardware resource on a network, the resource scheduler records scheduling efficiency in a predetermined period, transmits the scheduling efficiency to the operation monitoring server computer and, when the resource scheduler is selected by the resource management client, receives from the resource management client a request for use of a hardware resource, and the resource management client receives from the operation monitoring server computer the scheduling efficiency of the resource allocation of each of a plurality of resource schedulers, selects a resource scheduler with the highest efficiency based on the scheduling efficiency of the resource allocation, and transmits a request for use of a hardware resource to the selected resource scheduler.

* * * * *